United States Patent
Suzuki et al.

(10) Patent No.: US 10,323,449 B2
(45) Date of Patent: Jun. 18, 2019

(54) OPENING/CLOSING DEVICE FOR OPENING/CLOSING BODY

(71) Applicant: AISIN SEIKI KABUSHIKI KAISHA, Kariya-shi (JP)

(72) Inventors: Seiichi Suzuki, Miyoshi (JP); Shin Sakai, Kariya (JP); Eisuke Nakanishi, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 339 days.

(21) Appl. No.: 15/107,370

(22) PCT Filed: Dec. 23, 2014

(86) PCT No.: PCT/JP2014/084009
§ 371 (c)(1),
(2) Date: Jun. 22, 2016

(87) PCT Pub. No.: WO2015/098897
PCT Pub. Date: Jul. 2, 2015

(65) Prior Publication Data
US 2017/0002598 A1  Jan. 5, 2017

(30) Foreign Application Priority Data

Dec. 25, 2013 (JP) ................... 2013-267864

(51) Int. Cl.
*E05F 15/643* (2015.01)
*E05F 15/655* (2015.01)
(Continued)

(52) U.S. Cl.
CPC ............. *E05F 15/643* (2015.01); *B60J 5/047* (2013.01); *E05F 15/646* (2015.01);
(Continued)

(58) Field of Classification Search
CPC ...... E05F 15/643; E05F 15/646; E05F 15/655; B60J 5/047; E06B 3/4636; F16H 55/46
See application file for complete search history.

(56) References Cited

U.S. PATENT DOCUMENTS

| | | | |
|---|---|---|---|
| 6,490,832 B1 * | 12/2002 | Fischbach | E05F 15/643 52/207 |
| 6,698,138 B1 * | 3/2004 | Lin | E05D 15/0639 16/105 |
| 2004/0221510 A1 * | 11/2004 | Fukumoto | B60J 5/06 49/360 |
| 2007/0108798 A1 * | 5/2007 | Nishimura | B60J 5/06 296/155 |

(Continued)

FOREIGN PATENT DOCUMENTS

| JP | 5-50226 U | 7/1993 |
|---|---|---|
| JP | 2007-100359 A | 4/2007 |

(Continued)

OTHER PUBLICATIONS

English translation of the International Preliminary Report on Patentability and Written Opinion dated Jun. 28, 2016 in PCT/JP2014/084009.

(Continued)

*Primary Examiner* — Gregory J Strimbu
(74) *Attorney, Agent, or Firm* — Oblon, McClelland, Maier & Neustadt, L.L.P.

(57) ABSTRACT

An opening and closing apparatus of an opening and closing member includes a support member including a first support wall portion and a second support wall portion, a support pin including axially opposed end portions, a pulley arranged between the first and second support wall portions, a transmission belt engaged with the pulley, and an electric drive source moving the transmission belt. The first support wall portion includes a penetration bore into which one of the (Continued)

axially opposed end portions of the support pin is inserted and a slit continuously provided to the insertion bore. An engagement portion is provided at an axial tip end of the support pin, the engagement portion including a step engageable with a peripheral edge portion of the penetration bore and a tapered portion connected to the step and reduced in diameter from the step towards a tip end of the engagement portion.

8 Claims, 5 Drawing Sheets

(51) Int. Cl.
- *B60J 5/04* (2006.01)
- *E06B 3/46* (2006.01)
- *E05F 15/646* (2015.01)
- *B60J 5/06* (2006.01)

(52) U.S. Cl.
CPC .......... *E05F 15/655* (2015.01); *E06B 3/4636* (2013.01); *B60J 5/06* (2013.01); *E05Y 2201/434* (2013.01); *E05Y 2201/652* (2013.01); *E05Y 2900/531* (2013.01)

(56) References Cited

U.S. PATENT DOCUMENTS

| | | | |
|---|---|---|---|
| 2010/0180508 A1* | 7/2010 | Yamaguchi | B60J 5/06 49/358 |
| 2010/0199567 A1* | 8/2010 | Ishida | E05F 15/646 49/360 |
| 2012/0261894 A1* | 10/2012 | Ishida | B60J 5/06 280/166 |
| 2013/0333290 A1* | 12/2013 | Ishigaki | B60J 5/06 49/349 |

FOREIGN PATENT DOCUMENTS

| JP | 2011-105263 A | | 6/2011 |
|---|---|---|---|
| WO | WO 2009/066652 | * | 5/2009 |

OTHER PUBLICATIONS

International Search Report dated Mar. 3, 2015 in PCT/JP2014/084009, filed Dec. 23, 2014.

* cited by examiner

OPENING/CLOSING DEVICE FOR OPENING/CLOSING BODY

TECHNICAL FIELD

This invention relates to an opening and closing apparatus of an opening and closing member.

BACKGROUND ART

An opening and closing apparatus of an opening and closing member generally includes a pulley and a transmission belt engaged at the pulley. The transmission belt is linked to the opening and closing member. The aforementioned apparatus opens and closes the opening and closing member by driving the pulley to rotate by an electric drive source to move the transmission belt.

As illustrated in FIG. 6, an opening and closing apparatus disclosed in Patent document 1, for example, includes a support member 101 made of resin. The support member 101 includes a pair of support wall portions 101a and 101b arranged side by side in a height direction of a vehicle to be integrally provided. In a state where a pulley 102 is disposed between the support wall portions 101a and 101b, axially opposed end portions of a support pin 104 of the pulley 102 are supported at the support wall portions 101a and 101b, respectively. A belt 103 is engaged at the pulley 102. Each of the support wall portions 101a and 101b includes an opening portion which opens in a radial direction from an axis of the pulley 102 towards a contact portion between the pulley 102 and the belt 103. Each of the support wall portions 101a and 101b is formed in a substantially U-shape, i.e., in a non-annular form. The axially opposed end portions of the support pin 104 are press-fitted to the respective opening portions of the support wall portions 101a and 101b so that the support pin 104 is supported at the support wall portions 101a and 101b. Accordingly, the pulley 102 is supported to rotate around the support pin 104.

DOCUMENT OF PRIOR ART

Patent Document

Patent document 1: Japanese Patent Application Publication 2011-105263

OVERVIEW OF INVENTION

Problem to be Solved by Invention

In Patent document 1, in a case where the support pin 104 is continuously received at the respective opening portions of the support wall portions 101a and 101b, a so-called creep deformation where the support wall portions 101a and 101b are inhibited from recovering from a state being deformed due to a press-fitting load of the support pin 104 may occur. In this case, the support of the support pin 104 may be weakened. In a case where tension is not generated at the belt 103 or tension of the belt 103 tentatively decreases, the support pin 104 may disengage from the support wall portions 101a and 101b.

Annular support wall portions including penetration bores respectively into each of which the support pin is insertable are known as the pair of support wall portions. Nevertheless, at a time of forming the support member, a molten resin flows in a branching manner around each of the penetration bores of the support wall portions and then joins together. As a result, a weld line (which is hereinafter referred to as "weld") is generated at the aforementioned joined portion. Thus, when the pulley is supported in a state where the support pin is inserted to be positioned within the penetration bores of the respective wall portions as mentioned above, a crack is generated at the support wall portion because of the weld as an origin. The support pin may thus possibly disengage from the respective support wall portions.

An object of the present invention is to provide an opening and closing apparatus of an opening and closing member which restrains a support pin supporting a pulley from disengaging from a support wall portion of a support member.

Means for Solving Problem

An opening and closing apparatus of an opening and closing member which solves the aforementioned issue includes a support member including a first support wall portion and a second support wall portion which are arranged facing each other, the support member being made of resin, a support pin including axially opposed end portions which are inserted to be positioned at the first support wall portion and the second support wall portion respectively, a pulley arranged between the first support wall portion and the second support wall portion, the pulley into which the support pin is inserted to be positioned, a transmission belt engaged at the pulley and linked to the opening and closing member, and an electric drive source moving the transmission belt by driving the pulley to rotate around an axis of the support pin for opening and closing the opening and closing member. The first support wall portion includes a penetration bore into which one of the axially opposed end portions of the support pin is inserted to be positioned and a slit continuously provided to the insertion bore, the slit being provided for inhibiting a weld from existing at the first support wall portion after the first support wall portion is formed. An engagement portion is provided at an axial tip end of the support pin which penetrates through the penetration bore, the engagement portion including a step engageable with a peripheral edge portion of the penetration bore and a tapered portion connected to the step and reduced in diameter towards a tip end of the engagement portion.

An opening and closing apparatus of an opening and closing member which solves the aforementioned issue includes a support member including a first support wall portion and a second support wall portion which are arranged facing each other, a support pin including axially opposed end portions which are inserted to be positioned at the first support wall portion and the second support wall portion respectively, a pulley arranged between the first support wall portion and the second support wall portion and including a pin penetration bore into which the support pin is inserted to be positioned and a bearing mounting bore which opens wider than the pin penetration bore, a bearing including an outer race press-fitted to the bearing mounting bore in a state where the outer race makes contact with a peripheral edge portion of the pin penetration bore, an inner race which is arranged at a radially inner side of the outer race and into which the support pin is inserted to be positioned, and a rolling element arranged between the outer race and the inner race, a transmission belt engaged at the pulley and linked to the opening and closing member, an electric drive source moving the transmission belt by driving the pulley to rotate around the support pin via the bearing for opening and closing the opening and closing member, and a spacer into which the support pin is inserted to be positioned in a state where the support pin makes contact with the inner race and one of the first and second support wall portions.

MODE FOR CARRYING OUT THE INVENTION

An embodiment of an opening and closing apparatus is explained below. In the following, a front-rear direction of a vehicle is simply referred to as a "front-rear direction". An upper side and a lower side in a height direction of the vehicle are simply referred to as an "upper side" and a "lower side". An inner side in a width direction of the vehicle towards an inside of a vehicle interior is simply referred to as a "vehicle inner side". An outer side in the width direction of the vehicle towards an outside of the vehicle interior is simply referred to as a "vehicle outer side".

Figure 4:
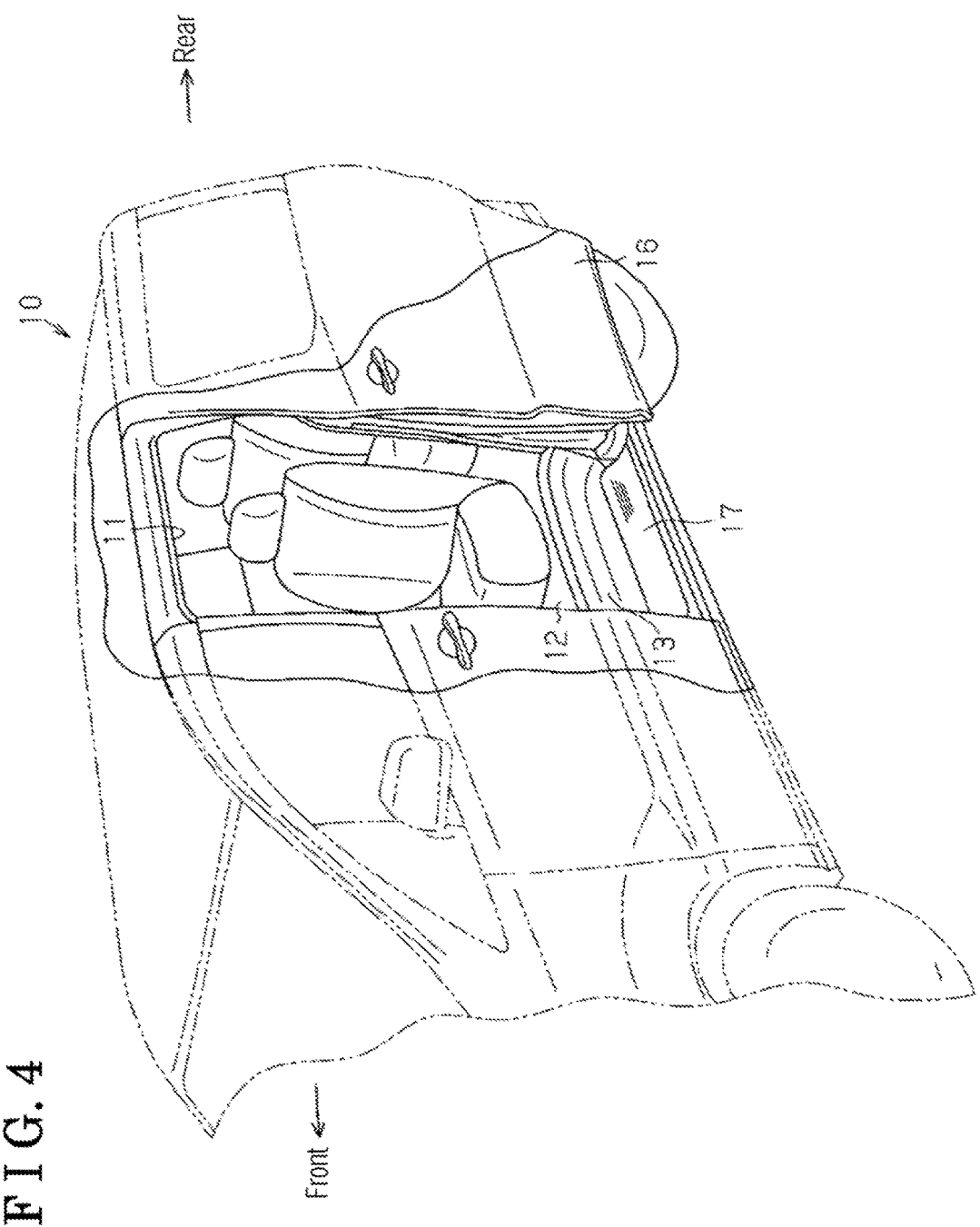
FIG. 4 is a perspective view illustrating a vehicle at which the opening and closing apparatus in FIG. 1 is employed.

As illustrated in FIG. 4, a body 10 of the vehicle includes an opening 11 for getting in and out. A slide door 16 serving as an opening and closing member which opens and closes the opening 11 is supported at the body 10 so as to be movable in the front-rear direction. A recess portion 13 is provided at a floor 12 of the vehicle so as to face the opening 11. In addition, a step panel 17 serving as a support member is mounted at the recess portion 13.

Figure 1:
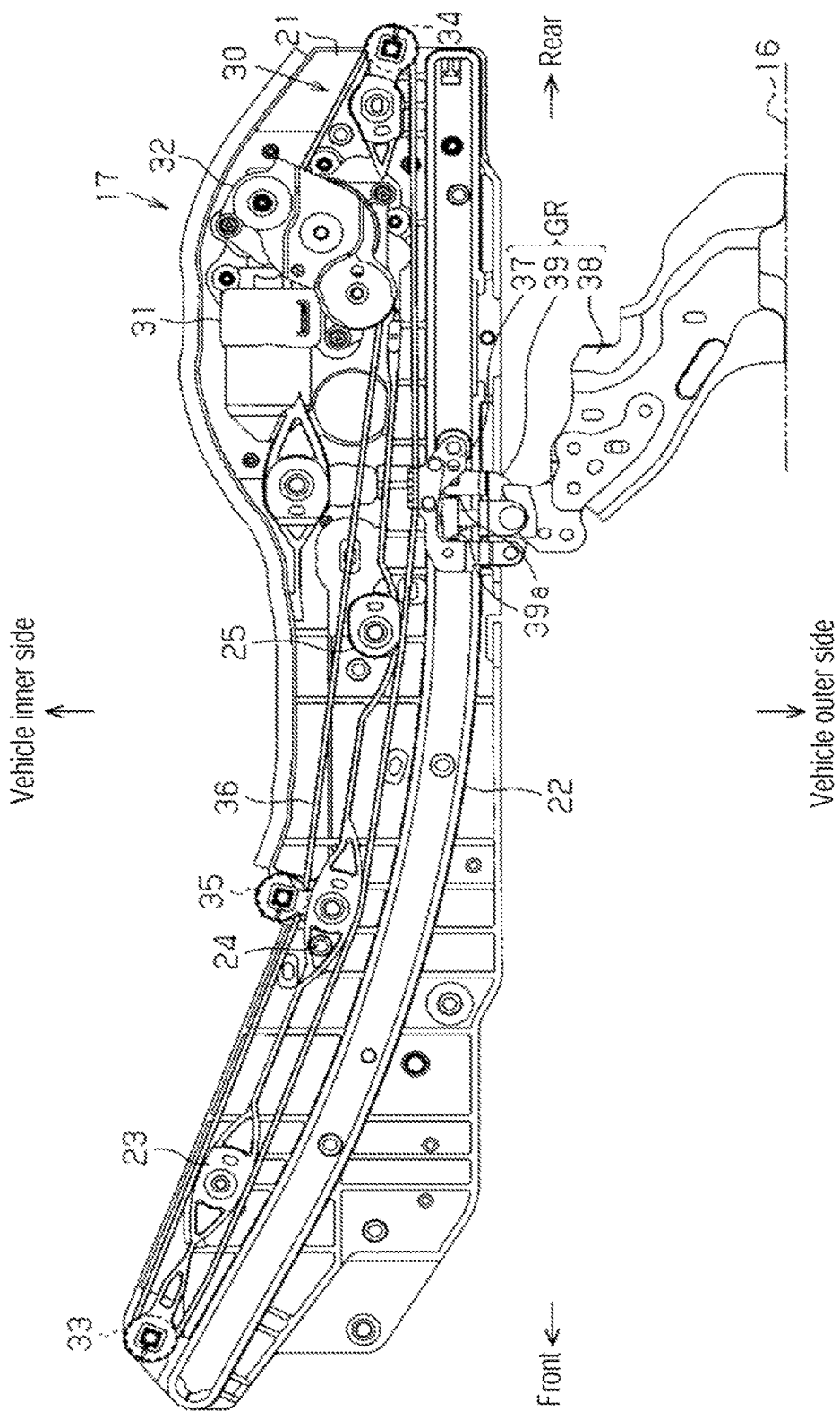
FIG. 1 is a bottom plan view illustrating an opening and closing apparatus according to an embodiment of the present invention.

As illustrated in FIG. 1, the step panel 17 which is made of resin includes a body portion 21 in a substantially flat plate form extending in the front-rear direction and a lower rail 22 extending downward (front side that is orthogonal to a paper surface on which FIG. 1 is drawn) from a portion of the body portion 21 at the vehicle outer side. The lower rail 22 extends in the font-rear direction substantially along the body portion 21. The lower rail 22 includes longitudinal walls facing each other in the vehicle width direction and extending in parallel to each other. The step panel 17 includes plural guide walls 23, 24 and 25 extending downward from the body portion 21 at positions at the vehicle inner side than the lower rail 22 and adjacent to the lower rail 22. The guide walls 23 to 25 are arranged at intervals in the front-rear direction so as to extend substantially along the lower rail 22.

A drive unit 30 is disposed at the body portion 21 so as to be positioned at the vehicle inner side than the lower rail 22 and adjacent to the lower rail 22. The drive unit 30 includes a motor 31 which includes a reducer and which is fixed to the body portion 21 at a rear side of the guide wall 25. The motor 31 serves as an electric drive source. The drive unit 30 also includes a drive pulley unit 32 driven by the motor 31. The drive unit 30 further includes a pair of pulleys, i.e., toothed driven pulleys 33, 34, and an idle pulley 35. The driven pulleys 33 and 34 are supported at a front end and a rear end of the body portion 21 so as to be rotatable around respective axes of the driven pulleys 33 and 34, the axes extending in the vehicle height direction. The idle pulley 35 is supported to be rotatable around an axis thereof extending in the vehicle height direction at the vehicle inner side than the guide wall 24 and at a portion of the body portion 21 adjacent to the guide wall 24.

The drive unit 30 includes an endless toothed belt 36 in a ring form serving as a transmission belt. The endless toothed belt 36 is wound and engaged at the driven pulleys 33 and 34, for example. The endless toothed belt 36 includes a first portion positioned at a side close to the lower rail 22 and serving as a portion extending substantially along the lower rail 22 between the two driven pulleys 33, 34 and a second portion positioned at a side separating from the lower rail 22. The first portion makes contact with respective portions of the guide walls 23 to 25 facing the lower rail 22. The second portion is meshed with the drive pulley unit 32 and passes through between the guide wall 24 and the idle pulley 35 so as to engage with the idle pulley 35. The second portion further makes contact with a portion of the guide wall 23 at a side opposite from the lower rail 22. In a case where the drive pulley unit 32 is driven by the motor 31, the endless toothed belt 36 moves substantially along the lower rail 22 in a direction conforming to a rotation direction of the drive pulley unit 32 while the driven pulleys 33, 34, for example, are driven to rotate.

A belt-side bracket 37 in a substantially U-shape made of a metallic plate, for example, is provided at a predetermined position (in a state of FIG. 1, at a position in the vicinity of the guide wall 25) of the first portion of the endless toothed belt 36. The belt-side bracket 37 holds the endless toothed belt 36. As a result, the belt-side bracket 37 is fixed to the belt 36 so as to integrally move with the endless toothed belt 36. A door-side bracket 38 in a substantially arm form made of a metallic plate, for example, is fixed to the slide door 16. A guide member 39 mounted to the lower rail 22 to be movable thereto is connected to the door-side bracket 38. The guide member 39 is tightened to the belt-side bracket 37. Thus, in a case where the belt-side bracket 37 moves together with the endless toothed belt 36 in the front-rear direction, the slide door 16 moves together with the guide member 39 and the door-side bracket 38 in the front-rear direction. The belt-side bracket 37, the door-side bracket 38 and the guide member 39 constitute a guide roller unit GR. The guide member 39 includes a pair of rollers 39a which is rotatable around axes thereof extending in the vehicle height direction and which is rollable on the lower rail 22. The guide member 39 guides a movement of the slide door 16 in the front-rear direction.

Figure 2A:
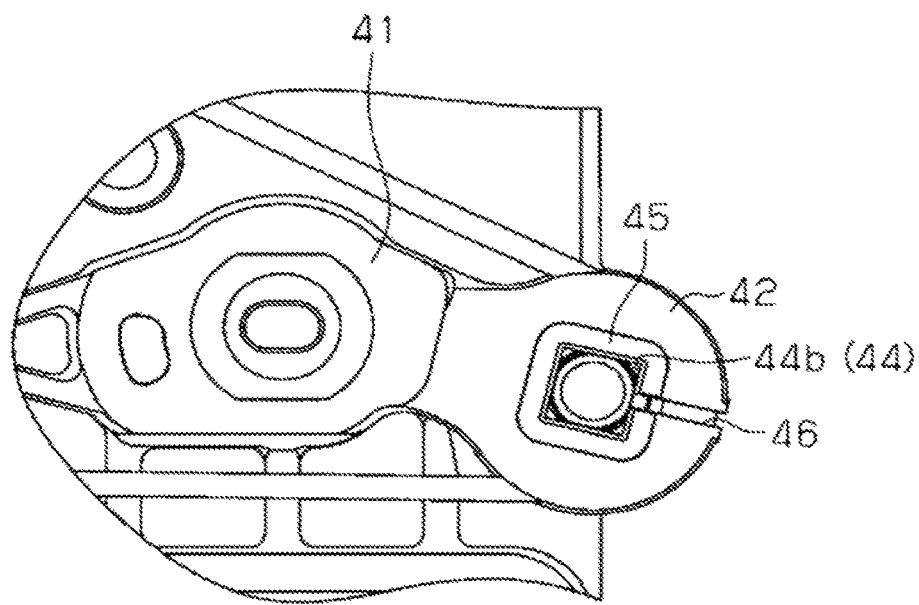
FIG. 2A is a partially enlarged bottom plan view illustrating a rear end portion of a step panel in FIG. 1.
Figure 2B:
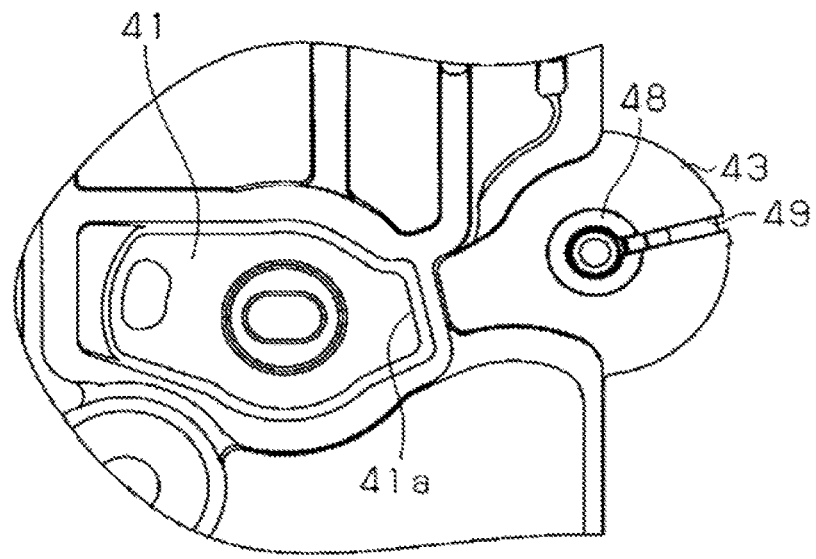
FIG. 2B is a partially enlarged plan view illustrating the rear end portion of the step panel in FIG. 1.
Figure 3A:
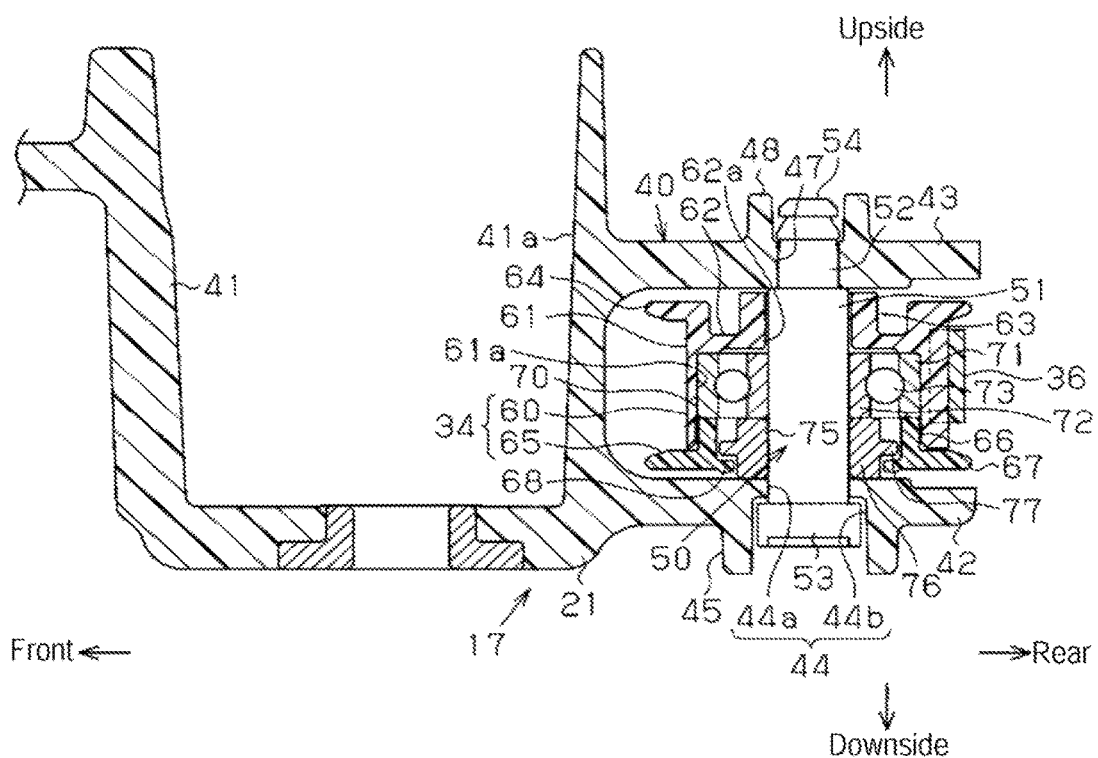
FIG. 3A is a longitudinal section view illustrating a driven pulley in FIG. 1.

Next, a support construction of the driven pulley 34 provided at a rear side is explained. As illustrated in FIGS. 2A, 2B and 3A, the body portion 21 includes a leg portion 41 and a pair of support wall portions 42, 43 at the rear end. The leg portion 41, which is in a substantially tubular form with a bottom, extends downward. The pair of support wall portions 42 and 43, each of which is in a substantially flat plate form, extends rearward from a lower end portion and an upper end portion of a rear-side longitudinal wall 41a of the leg portion 41. The support wall portions 42 and 43 are arranged facing each other in the vehicle height direction so as to be substantially in parallel to each other. The support wall portions 42, 43 and the longitudinal wall 41a include a pulley support portion 40 including a substantially U-shape cross-section and opening rearward. The step panel 17 is tightened to the recess portion 13 at the leg portion 41.

The support wall portion 42 provided at a lower side and serving as a second support wall portion includes an attachment bore 44 penetrating through a center portion of the support wall portion 42 in the vehicle height direction. The attachment bore 44 includes a circular insertion bore 44*a* and a substantially quadrangular fitting bore 44*b* provided at a lower side of the insertion bore 44*a* and being wider than the insertion bore 44*a*. The support wall portion 42 includes a surrounding wall 45 in a substantially quadrangular tubular form protruding downward so as to be continuously provided to the fitting bore 44*b*. Further, as illustrated in FIG. 2A, the support wall portion 42 includes a slit 46 extending radially outward from a predetermined angular position of the attachment bore 44, i.e., continuously provided to the attachment bore 44. The slit 46 is provided by cutting of the support wall portion 42 and the surrounding wall 45.

The support wall portion 43 provided at an upper side and serving as a first support wall portion includes a circular penetration bore 47 penetrating through a center portion of the support wall portion 43 in the vehicle height direction and being coaxial with the attachment bore 44. The penetration bore 47 includes an inner diameter smaller than an inner diameter of the insertion bore 44*a* of the attachment bore 44. The support wall portion 42 includes a substantially cylindrical protective wall 48 extending upward around the penetration bore 47 and opening wider than the penetration bore 47. Further, as illustrated in FIG. 2B, the support wall portion 43 includes a slit 49 extending radially outward from a predetermined angular position of the penetration bore 47, i.e., continuously provided to the penetration bore 47. The slit 49 is provided by cutting of the support wall portion 43 and the protective wall 48.

The slits 46 and 49 are provided so that weld is inhibited from existing at the support wall portions 42 and 43 after forming thereof. Specifically, each of the slits 46 and 49 may be obtained with a die (slide die) at a time the step panel 17 is formed. Alternatively, each of the slits 46 and 49 may be obtained by removing the weld from an initial support wall portion after the step panel 17 is formed, i.e., from the support wall portion that is in a state where the slit is not formed and weld exists.

Axially opposed end portions of a support pin 50 are inserted to be positioned at the support wall portions 42 and 43. An axis of the support pin 50 extends in the vehicle height direction. The support pin 50 includes a large diameter portion 51 which includes an outer diameter substantially equal to the inner diameter of the insertion bore 44*a* and a length substantially equal to a distance in the vehicle height direction between a lower end of the insertion bore 44*a* and a lower end of the penetration bore 47. The support pin 50 also includes a small diameter portion 52 which includes an outer diameter substantially equal to the inner diameter of the penetration bore 47 and a length substantially equal to a distance in the vehicle height direction between an upper end and the lower end of the penetration bore 47. Further, the support pin 50 includes a head portion 53 connected to a lower end of the large diameter portion 51 and an engagement portion 54 connected to an upper end of the small diameter portion 52.

The head portion 53 is formed in a substantially quadrangular prism which is slightly smaller than an inner wall surface of the surrounding wall 45, i.e., the fitting bore 44*b*. The head portion 53 includes a length smaller than a length of the surrounding wall 45 in the vehicle height direction. That is, the head portion 53 is retracted upward relative to a lower end of the surrounding wall 45, i.e., a tip end of the surrounding wall 45.

Figure 3B:
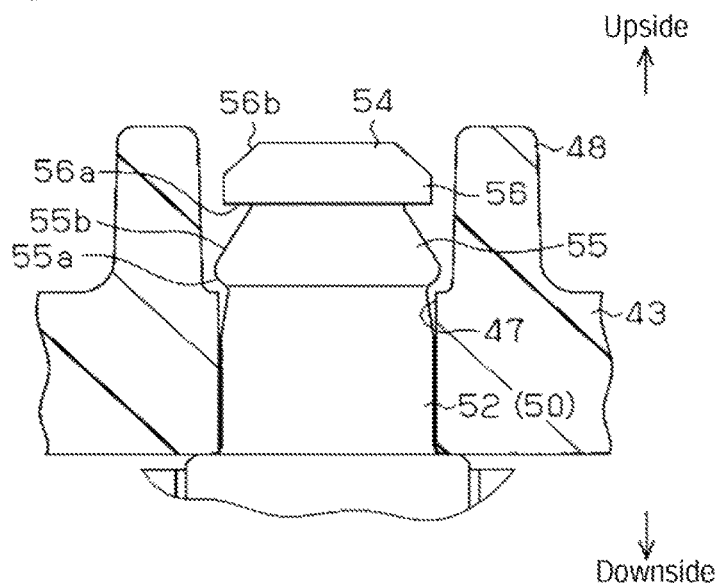
FIG. 3B is a partially enlarged view of FIG. 3A.

As illustrated in an enlarged manner in FIG. 3B, the engagement portion 54 includes an engaging portion 55 connected (continuously provided) to the upper end of the small diameter portion 52 and a guiding portion 56 connected (continuously provided) to an upper end of the engaging portion 55. The engaging portion 55 includes a first step 55*a* and a first tapered portion 55*b* so as to be formed in a substantially truncated cone. The first step 55*a* is connected (continuously provided) to the upper end of the small diameter portion 52 in a state where a diameter of the first step 55*a* is greater than the diameter of the small diameter portion 52. The first tapered portion 55*b* is connected (continuously provided) to the first step 55*a* and reduced in diameter towards the upper end, i.e., tip end, of the engaging portion 55. The guiding portion 56 includes a second step 56*a* and a second tapered portion 56*b* so as to be formed in a substantially truncated cone. The second step 56*a* is connected (continuously provided) to the engaging portion 55 in a state where a diameter of the second step 56*a* is greater than a diameter of the upper end of the engaging portion 55. The second tapered portion 56*b* is connected (continuously provided) to the second step 56*a* and reduced in diameter towards an upper end, i.e., tip end, of the guiding portion 56. That is, the engagement portion 54 includes a configuration where two of the substantially truncated cones overlap in the vehicle height direction (axial direction of the support pin 50). Each of the engaging portion 55 and the guiding portion 56 includes a maximum diameter greater than the inner diameter of the penetration bore 47 and smaller than an inner diameter of the protective wall 48. In addition, each of the engaging portion 55 and the guiding portion 56 includes a minimum diameter smaller than the inner diameter of the penetration bore 47.

The maximum diameter of the engaging portion 55 is greater than the maximum diameter of the guiding portion 56. In addition, an inclination angle of the first tapered portion 55*b* relative to the axis of the support pin 50 is smaller than an inclination angle of the second tapered portion 56*b* relative to the axis of the support pin 50. The engagement portion 54 includes a length smaller than a length of the protective wall 48 in the vehicle height direction. That is, the engagement portion 54 is retracted downward relative to an upper end, i.e., tip end, of the protective wall 48. The protective wall 48 extends from the support wall portion 43 beyond a tip end of the engagement portion 54.

The support pin 50 is assembled on the pulley support portion 40 from a lower side to an upper side thereof. Accordingly, upon assembly of the support pin 50, the engagement portion 54 and the small diameter portion 52 are sequentially inserted to the insertion bore 44*a* of the support wall portion 42, and then the large diameter portion 51 is inserted to the insertion bore 44*a* of the support wall portion 42. The support pin 50 is restricted from moving upward in a state where the head portion 53 inserted to the fitting bore 44*b* engages with a peripheral edge portion of the lower end of the insertion bore 44*a* or an upper end of the large diameter portion 51 engages with a peripheral edge portion of the lower end of the penetration bore 47. The guiding portion 56 and the engaging portion 55 of the engagement portion 54 are inserted (press-fitted) to push out the penetration bore 47 of the support wall portion 43 in a stepwise manner. The small diameter portion 52 is then inserted to the penetration bore 47. The lower end portion of the large diameter portion 51 and the head portion 53 constitute an axially one end portion of the support pin 50 and the small diameter portion 52 and the engagement portion 54 constitute an axially other end portion of the support pin 50. The support pin 50 is restricted from moving downward in a state where the first step 55a of the engaging portion 55 that has penetrated through the penetration bore 47 engages with a peripheral edge portion of the upper end of the penetration bore 47. As a result, the support pin 50 is inhibited from disengaging from the pulley support portion 40. As mentioned above, the slit 49 is provided at the support wall portion 43. The slit 49 eases an elastic deformation of the support wall portion 43 in a case where the engagement portion 54 is inserted to the penetration bore 47 to thereby restrain a load applied to the support wall portion 43.

As illustrated in FIG. 3A, the driven pulley 34 is disposed between the support wall portions 42 and 43. The large diameter portion 51 of the support pin 50 penetrates through the driven pulley 34 and supports the driven pulley 34. The driven pulley 34 includes a body portion 60 and a plate portion 65 which are made of resin, for example. The body portion 60 includes a pulley portion 61 in a substantially tubular form including a circular bearing mounting bore 61a which is coaxial with the support pin 50, and a cover wall portion 62 connected to an upper end portion of the pulley portion 61. The cover wall portion 62 includes a pin penetration bore 62a which includes a circular form and through which the large diameter portion 51 penetrates, so as to be formed in a substantially annular form. The body portion 60 includes a boss portion 63 substantially in a cylindrical form continuously provided to an inner wall surface of the pin penetration bore 62a and protruding upward and a retainer portion 64 in a substantially annular form extending radially outward from an upper end of the pulley portion 61. The body portion 60 is restricted from moving upward in a state where an upper end of the boss portion 63 is positioned close to the peripheral edge portion of the lower end of the penetration bore 47.

Plural teeth are provided at an outer peripheral portion of the pulley portion 61 at even angular intervals over an entire periphery. The plural teeth extend in parallel to an axial direction of the driven pulley 34. The plural teeth are provided being meshed with the endless toothed belt 36. The retainer portion 64 is positioned at a lower side than the upper end of the boss portion 63. Therefore, even if the boss portion 63 makes contact with the support wall portion 43, the retainer portion 64 is inhibited from interfering with the support wall portion 43.

A bearing 70 is mounted to the body portion 60. The bearing 70 is press-fitted to the bearing mounting bore 61a in a state making contact with a peripheral edge portion of a lower end of the pin penetration bore 62a, i.e., a lower surface of the cover wall portion 62. The bearing 70 includes an outer race 71, an inner race 72 which is disposed at a radially inner side than the outer race 71 and through which the large diameter portion 51 penetrates, and plural rolling elements 73 each in a substantially spherical form arranged between the outer race 71 and the inner race 27. The body portion 60 is supported to be rotatable at the large diameter portion 51 of the support pin 50 via the bearing 70. The driven pulley 34, specifically, the body portion 60, is supported to be rotatable at the support pin 50 by means of a rolling friction smaller than a sliding friction.

The plate portion 65 includes an insertion portion 66 in a substantially cylindrical form including an outer diameter equal to an inner diameter of the bearing mounting bore 61a, a retainer portion 67 in a substantially annular form extending radially outward from a lower end of the insertion portion 66, and a guide flange 68 in a substantially annular form extending radially inward from the lower end of the insertion portion 66. The plate portion 65 is fixed to the body portion 60 because the insertion portion 66 is press-fitted to the bearing mounting bore 61a in a state where an upper end of the retainer portion 67 makes contact with a lower end of the pulley portion 61. In the aforementioned state, an upper end of the insertion portion 66 makes contact with or comes closer to a lower end of the outer race 71 of the bearing 70. The retainer portion 67 includes substantially the same outer diameter as the outer diameter of the retainer portion 64 of the body portion 60. The retainer portion 67 operates in cooperation with the retainer portion 64 for inhibiting the endless toothed belt 36 meshed with the pulley portion 61 from disengaging in the vehicle height direction.

A spacer 75 is disposed at the radially inner side of the plate portion 65. The spacer 75 includes a restriction portion 76 in a substantially cylindrical form. The restriction portion 76 includes an inner diameter substantially the same as the outer diameter of the large diameter portion 51 and includes an outer diameter slightly smaller than an inner diameter of the guide flange 68 and smaller than an inner diameter of the outer race 71. The spacer 75 includes a guide flange 77 in a substantially annular form which is arranged at an upper side of the guide flange 68 of the restriction portion 76 so as to protrude radially outward from an axially intermediate portion of the spacer 75. The guide flange 77 includes an outer diameter slightly smaller than an inner diameter of the insertion portion 66. The large diameter portion 51 is inserted to be positioned within the restriction portion 76 of the spacer 75 in a state where a lower end and an upper end of the restriction portion 76 make contact with a peripheral end portion of the upper end of the insertion bore 44a and a lower end of the inner race 72 respectively. In the aforementioned state, the retainer portion 67 of the plate portion 65 is positioned at an upper side than the lower end of the restriction portion 76. Thus, the retainer portion 67 is inhibited from interfering with the support wall portion 42.

In a case where the support pin 50 is assembled on the pulley support portion 40, the large diameter portion 51 is sequentially inserted to the spacer 75, the inner race 72 and the body portion 60. At this time, the spacer 75 is guided to be coaxially arranged with the inner race 72, for example, in a state where an outer peripheral surface of the restriction portion 76 comes closer to an inner peripheral surface of the guide flange 68 and an outer peripheral surface of the guide flange 77 comes closer to an inner peripheral surface of the insertion portion 66. Accordingly, the support pin 50 is smoothly assembled on the driven pulley 34, for example, arranged between the support wall portions 42 and 43.

The support construction of the driven pulley 33 at the front side is similar to the driven pulley 34 at the rear side and therefore an explanation is omitted. Next, an operation of the present embodiment is explained.

In a case where the support pin 50 is assembled along the axial direction thereof on the pulley support portion 40 at which the driven pulley 34, for example, is arranged between the support wall portions 42 and 43, the engagement portion 54 pushes out the penetration bore 47 to penetrate through the penetration bore 47 so that the slit 49 opens in a circumferential direction by the first tapered portion 55b, for example. The engagement portion 54 is inhibited from disengaging from the penetration bore 47 because of the first step 55a which engages with the peripheral edge portion of the penetration bore 47. The slit 49 at least includes an opening width with which a generation of elastic deformation of the support wall portion 43 in a case where the engagement portion 54 passes through the penetration bore 47 may be enhanced. Thus, even in a case where a creep deformation is generated at the support wall portion 43, the support of the support pin 50 is restrained from being weakened. In addition, the slit 49 is provided to inhibit weld from existing at the support wall portion 43 after the support wall portion 43 is formed, so that a generation of crack at the support wall portion 43 because of the weld as an origin may be inhibited. The driven pulley 33 at the front side includes the similar operation as the driven pulley 34 at the rear side.

As mentioned above, according to the embodiment, the following effects are obtainable.

(1) In the embodiment, the slit 49 at least includes the opening width with which the elastic deformation of the support wall portion 43 generated when the engagement portion 54 passes through the penetration bore 47 may be enhanced. Thus, even if the creep deformation is generated at the support wall portion 43, the support of the support pin 50 is restrained from being weakened. In addition, the slit 49 is provided to inhibit the weld from existing at the support wall portion 43 after the support wall portion 43 is formed so that the generation of crack at the support wall portion 43 because of the weld as the origin may be inhibited. As a result, the support pin 50 is restrained from disengaging from the support wall portion 43.

(2) In the embodiment, in a case where one of the axially opposed end portions of the support pin 50 is inserted to the penetration bore 47 of the support wall portion 43 along the axial direction, the engagement portion 54 sequentially pushes out the penetration bore 47 to smoothly pass through the penetration bore 47 so that the slit 49 opens in the circumferential direction by the second tapered portion 56b and the first tapered portion 55b.

(3) In the embodiment, the inclination angle of the second tapered portion 56b relative to the axis of the support pin 50 is greater than the inclination angle of the first tapered portion 55b relative to the axis of the support pin 50. Thus, in a case where one of the axially opposed end portions of the support pin 50 is inserted to the penetration bore 47 of the support wall portion 43 along the axial direction, dimensions of the second tapered portion 56b in the axial direction for pushing out the penetration bore 47 in a first stage, i.e., a moving distance of the second tapered portion 56b (guiding portion 56) for passing through the penetration bore 47, may be restrained.

(4) In the embodiment, the maximum diameter of the second tapered portion 56b is smaller than the maximum diameter of the first tapered portion 55b. Thus, in a case where one of the axially opposed end portions of the support pin 50 is inserted to the penetration bore 47 of the support wall portion 43 along the axial direction, the engagement portion 54 gradually pushes out the penetration bore 47 to smoothly penetrate through the penetration bore 47 in a state where the second tapered portion 56b and the first tapered portion 55b open the slit 49 in the circumferential direction.

(5) In the present embodiment, the support wall portion 43 includes the protective wall 48 protruding beyond the tip end of the engagement portion 54 to surround the engagement portion 54. Because of the protective wall 48, the tip end of the engagement portion 54 is restrained from interfering with peripheral components. The support pin 50 is restrained from disengaging from the support wall portion 43 by the aforementioned interference.

(6) In the embodiment, the driven pulley 34 (33) is rotatably supported around the support pin 50 (large diameter portion 51) via the bearing 70 to thereby reduce the load generated upon rotation of the driven pulley 34 (33). In addition, the driven pulley 34 (33) is supported at the support pin 50 in a state where the outer race 71 of the bearing 70 makes contact with the peripheral edge portion of the pin penetration bore 62a and the spacer 75 makes contact with the inner race 72 and the support wall portion 42. Thus, even in a case where an external force and/or a force of gravity is applied to the driven pulley 34 (33) from the endless toothed belt 36, for example, the driven pulley 34 (33) is restricted from moving closer to the support wall portion 42, i.e., moving in the axial direction of the support pin 50. Thus, an increase of load caused by a sliding contact of the driven pulley 34 (33) with the support wall portion 42 when the driven pulley 34 (33) rotates is restrained.

(7) In the embodiment, changing an axial length of the spacer 75 (restriction portion 76) leads to an easily adjustment of a gap between the driven pulley 34 (33) and the support wall portion 42 in the axial direction. Specifically, in a case where a commonly-used mechanical component called a collar is employed as the spacer 75, the collar may be appropriately replaced in accordance with manufacturing variations or a design change so as to easily adjust the aforementioned gap.

(8) In the embodiment, even in a state before the driven pulley 34 (33) is assembled on the pulley support portion 40, the spacer 75 is restrained from disengaging from the driven pulley 34 (33) by the plate portion 65 (guide flange 68). An assembly performance of the driven pulley 34 (33), for example, relative to the pulley support portion 40 may improve.

(9) In the embodiment, engagement of the spacer 75 with the plate portion 65 may restrain an axis center of the spacer 75 from displacing relative to the driven pulley 34 (33). An assembly performance of the support pin 50 relative to the driven pulley 34 (33) and the spacer 75 may improve.

(10) In the embodiment, an assembly direction of the support pin 50 matches an assembly direction of the endless toothed belt 36, for example, relative to the step panel 17. Thus, the assembly performance of the support pin 50 may improve.

(11) In the embodiment, the plate portion 65 may inhibit intrusion of dust, for example, into the bearing 70. The aforementioned embodiment may be modified as follows.

Figure 5:
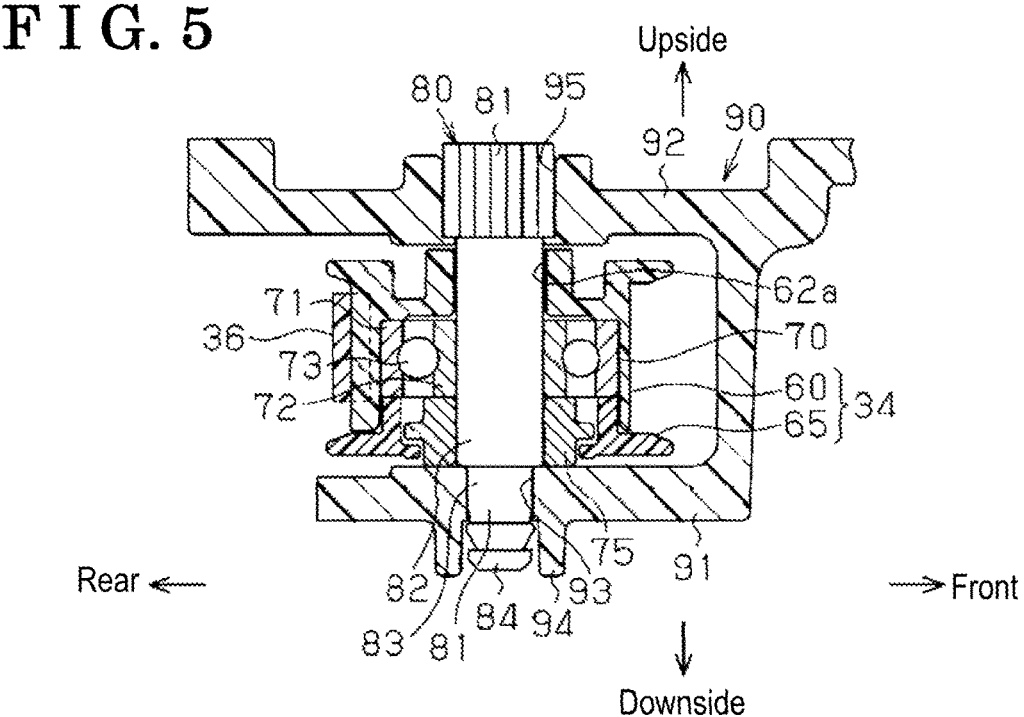
FIG. 5 is a longitudinal section view illustrating the opening and closing apparatus according to a different embodiment of the present invention.
Figure 6:
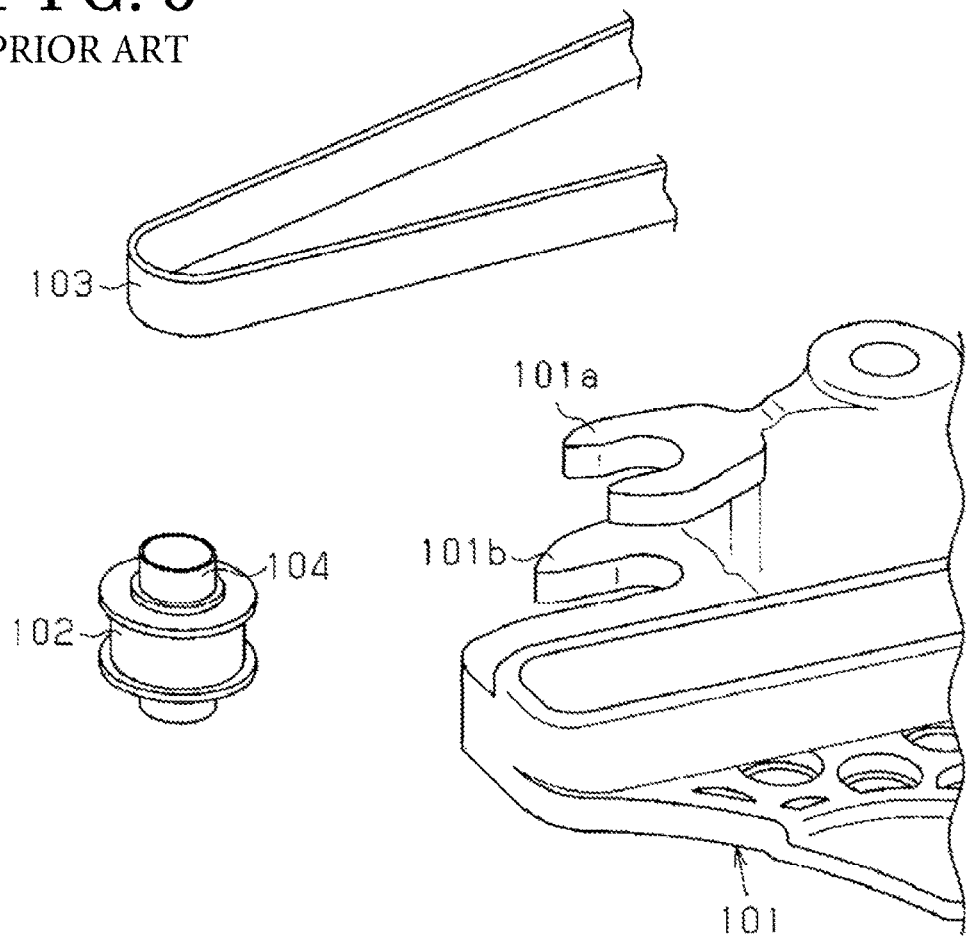
FIG. 6 is a perspective view illustrating a known opening and closing apparatus.

As illustrated in FIG. 5, a support pin 80 including a construction corresponding to the construction of the support pin 50 may be assembled on a pulley support portion 90 including a construction corresponding to the construction of the pulley support portion 40 from an upper side. The pulley support portion 90 includes a pair of support wall portions 91 and 92 each in a substantially flat plate form arranged facing each other in the vehicle height direction. The support wall portion 91 at the lower side serving as the first support wall portion includes a penetration bore 93 similar to the support wall portion 43 and a protective wall 94. The support wall portion 92 at the upper side serving as the second support wall portion includes a circular fitting bore 95 penetrating through a center portion of the support wall portion 92 in the vehicle height direction and being coaxial with the penetration bore 93. It is obvious that slits (not illustrated) are provided at the support wall portions 91 and 92 respectively for inhibiting weld from existing at the support wall portions 91 and 92.

The support pin 80 includes a head portion 81 in a substantially column form including an outer diameter substantially the same as an inner diameter of the fitting bore 95. The support pin 80 also includes a large diameter portion 82, a small diameter portion 83 and an engagement portion 84 similar to the support pin 50. Thus, in a case where the support pin 80 is assembled on the pulley support portion 90 from an upper side to a lower side, the engagement portion 84, the small diameter portion 83 and the large diameter portion 82 are sequentially inserted to the fitting bore 95 of the support wall portion 92 so that the head portion 81 is press-fitted to the fitting bore 95. A lower end of the large diameter portion 82 engages with a peripheral edge portion of an upper end of the penetration bore 93 so that the support pin 80 is restricted from moving downward. Further, the engagement portion 84 is inserted (press-fitted) relative to the penetration bore 93 of the support wall portion 91 so that the small diameter portion 83 is inserted to be positioned within the penetration bore 93. The support pin 80 is restricted from moving upward by an engagement of a step of the engagement portion 84 which penetrates through the penetration bore 93 with a peripheral edge portion of a lower end of the penetration bore 93.

With the assembly of the support pin 80 on the pulley support portion 90, the driven pulley 34 (33), for example, arranged between the support wall portions 91 and 92 is supported at the support pin 80. Specifically, even if a downward moving force is applied to the bearing 70 by a frictional force between the large diameter portion 82 and the inner race 72 when the large diameter portion 82 is inserted to the inner race 72 of the bearing 70, the bearing 70 is restricted from moving because of the spacer 75 which makes contact with the support wall portion 91.

Even with the aforementioned modifications, similar effects to the aforementioned embodiment are obtainable. The small diameter portion 83 of the support pin 80 may be press-fitted to the penetration bore 93 or loosely inserted to be positioned within the penetration bore 93. The large diameter portion 82 of the support pin 80 may be press-fitted to the pin penetration bore 62a or loosely inserted to be positioned within the pin penetration bore 62a. The large diameter portion 82 of the support pin 80 may be press-fitted to the bearing 70 (inner race 72) or loosely inserted to be positioned within the bearing 70 (inner race 72). The large diameter portion 82 of the support pin 80 may be press-fitted to the spacer 75 (restriction portion 76) or loosely inserted to be positioned within the spacer 75 (restriction portion 76).

In the embodiment, the large diameter portion 51 of the support pin 50 may be press-fitted to the insertion bore 44a or loosely inserted to be positioned within the insertion bore 44a. In the similar manner, the small diameter portion 52 of the support pin 50 may be press-fitted to the penetration bore 47 or loosely inserted to be positioned within the penetration bore 47.

In the embodiment, the large diameter portion 51 of the support pin 50 may be press-fitted to the bearing 70 (inner race 72) or loosely inserted to be positioned within the bearing 70 (inner race 72). In the embodiment, the large diameter portion 51 of the support pin 50 may be press-fitted to the spacer 75 (restriction portion 76) or loosely inserted to be positioned within the spacer 75 (restriction portion 76).

In the embodiment, the upper end of the large diameter portion 51 of the support pin 50 may make contact with or come closer to the peripheral edge portion of the lower end of the penetration bore 47. In the embodiment, the protective wall 48 may at least protrude to a position equivalent to the upper end of the engagement portion 54 from the support wall portion 43. In addition, the protective wall 48 may be omitted.

In the embodiment, the maximum diameter of the second tapered portion 56b may be substantially the same as the maximum diameter of the first tapered portion 55b. In the embodiment, the inclination angle of the second tapered portion 56b relative to the axis of the support pin 50 may be equal to or smaller than the inclination angle of the first tapered portion 55b relative to the axis of the support pin 50.

In the embodiment, the guiding portion 56 (second step 56a, second tapered portion 56b) of the engagement portion 54 of the support pin 50 may be omitted. In the embodiment, the slit 46 of the support wall portion 42 at the lower side may be omitted. The support construction of the lower end portion of the support pin 50 relative to the support wall portion 42 at the lower side may be arbitrarily specified.

In the embodiment, instead of the bearing 70, a bearing including a rolling element in a substantially column form may be employed. In the embodiment, the bearing 70 may be omitted. In this case, the driven pulley 34 (33) may be rotatably supported at the support pin 50, 80 or may be rotatably supported together with the support pin 50, 80 at the pulley support portion 40, 90.

In the embodiment, the spacer 75 may be omitted. Specifically, in a case where the spacer 75 is omitted together with the bearing 70, the body portion 60 and the plate portion 65 may be integrally provided. That is, the driven pulley 34 (33) may be constituted by a single member.

In the embodiment, the support construction of the idle pulley 35 may be the same as the support construction of the driven pulley 34, for example. In the embodiment, the step panel 17 also functions as the support member. Alternatively, being different from the step panel 17, a support member made of resin may be provided.

In the embodiment, instead of a combination of the toothed driven pulley 34 (33) and the endless toothed belt 36, a combination of a toothless pulley and a toothless endless belt or wire may be employed or a combination of a sprocket and a chain may be employed as a combination of the pulley and the transmission belt.

The opening and closing member may be a swing door, a back door, a trunk lid, a sunroof or a window glass, for example.

The invention claimed is:

1. An opening and closing apparatus for opening and closing an opening and closing member, comprising:
   a support member including a first support wall portion and a second support wall portion which are arranged facing each other, the support member being made of resin;
   a support pin including first and second axially opposed end portions which are inserted into the first support wall portion and the second support wall portion respectively;
   a pulley arranged between the first support wall portion and the second support wall portion, the support pin is disposed in the pulley;
   a transmission belt engages the pulley and is linked to the opening and closing member; and
   an electric drive source moving the transmission belt which rotates the pulley around an axis of the support pin for opening and closing the opening and closing member, wherein
   the first support wall portion includes a penetration bore into which the first axially opposed end portion of the support pin is inserted and a slit continuous with the penetration bore, the slit being provided for inhibiting a weld from existing at the first support wall portion after the first support wall portion is formed,
   an engagement portion is provided at the first axially opposed end portion of the support pin, the engagement portion including
- a first step engageable with a peripheral edge portion of the penetration bore,
- a first tapered portion connected to the first step and reducing in diameter as the first tapered portion extends from the first step towards a distal end of the engagement portion,
- a second step connected to a distal end of the first tapered portion and having a diameter larger than a diameter of the distal end of the first tapered portion, and
- a second tapered portion connected to the second step and reduced reducing in diameter as the second tapered portion extends in diameter from the second step towards the distal end of the engagement portion.

2. The opening and closing apparatus according to claim 1, wherein an inclination angle of the second tapered portion relative to an axis of the support pin is greater than an inclination angle of the first tapered portion relative to the axis of the support pin.

3. The opening and closing apparatus according to claim 1, wherein a maximum diameter of the second tapered portion is smaller than a maximum diameter of the first tapered portion.

4. The opening and closing apparatus according to claim 1, wherein the first support wall portion includes a protective wall extending from the first support wall portion at least the same distance the distal end of the engagement portion extends from the first support wall portion to surround the engagement portion.

5. The opening and closing apparatus according to claim 1, wherein the pulley includes a pin penetration bore in which the support pin is disposed and a bearing mounting bore which has a diameter greater than a diameter of the pin penetration bore, the opening and closing apparatus further including:
- a bearing including an outer race press-fitted into the bearing mounting bore such that the outer race makes contact with an inner wall of the bearing mounting bore, an inner race in which the support pin is disposed, and a rolling element arranged between the outer race and the inner race; and
- the support pin is disposed in a spacer which makes contact with the inner race and one of the first and second support wall portions.

6. The opening and closing apparatus according to claim 5, wherein the pulley includes a body and a plate portion,
- the body including the bearing mounting bore which is cylindrically shaped, a cover wall portion, which includes the pin penetration bore, at a first end portion of the body, and a first retainer portion protruding radially outward from the first end portion of the body,
- the plate portion including an insertion portion which is disposed in the bearing mounting bore and which is cylindrically shaped, a second retainer portion making contact with a second end portion of the body and protruding radially outward relative to the insertion portion, and a guide flange protruding radially inward relative to the insertion portion.

7. The opening and closing apparatus according to claim 6, wherein the spacer engages with the plate portion.

8. An opening and closing apparatus for opening and closing an opening and closing member, comprising:
- a support member including a first support wall portion and a second support wall portion which are arranged facing each other;
- a support pin including first and second axially opposed end portions which are inserted into the first support wall portion and the second support wall portion respectively;
- a pulley arranged between the first support wall portion and the second support wall portion and including a pin penetration bore in which the support pin is disposed and a bearing mounting bore which has a diameter greater than a diameter of the pin penetration bore;
- a bearing including an outer race press-fitted into the bearing mounting bore such that the outer race makes contact with an end wall of the bearing mounting bore in an axial direction of the pulley, an inner race into which the support pin is inserted, and a rolling element arranged between the outer race and the inner race;
- a transmission belt engages the pulley and is linked to the opening and closing member;
- an electric drive source moving the transmission belt which rotates the pulley around the support pin for opening and closing the opening and closing member; and
- the support pin is disposed in a spacer, the spacer engages the inner race and one of the first and second support wall portions, wherein
- the pulley includes a body and a plate member,
- the body includes the bearing mounting bore which is cylindrically shaped, a cover wall portion, which includes the pin penetration bore, at a first end portion of the body, and a first retainer portion protruding radially outward from the first end portion of the body,
- the plate portion includes an insertion member which is disposed in the bearing mounting bore and which is cylindrically shaped, a second retainer portion making contact with a second end portion of the body and protruding radially outward relative to the insertion portion, and a guide flange protruding radially inward relative to the insertion portion.

* * * * *